United States Patent
Salomon et al.

(10) Patent No.: US 11,030,545 B2
(45) Date of Patent: Jun. 8, 2021

(54) PROBABILISTIC FRAMEWORK FOR DETERMINING DEVICE ASSOCIATIONS

(71) Applicant: salesforce.com, inc., San Francisco, CA (US)

(72) Inventors: Yacov Salomon, Danville, CA (US); Jonathan Budd, London (GB)

(73) Assignee: salesforce.com, inc., San Francisco, CA (US)

( * ) Notice: Subject to any disclaimer, the term of this patent is extended or adjusted under 35 U.S.C. 154(b) by 441 days.

(21) Appl. No.: 16/172,288

(22) Filed: Oct. 26, 2018

(65) Prior Publication Data

US 2020/0134497 A1 Apr. 30, 2020

(51) Int. Cl.
*G06N 7/00* (2006.01)
*G06N 20/00* (2019.01)
*G06F 16/248* (2019.01)
*G06F 16/901* (2019.01)

(52) U.S. Cl.
CPC .......... *G06N 7/005* (2013.01); *G06F 16/248* (2019.01); *G06F 16/9024* (2019.01); *G06N 20/00* (2019.01)

(58) Field of Classification Search
CPC ...... G06N 7/005; G06N 20/00; G06F 16/248; G06F 16/9024
See application file for complete search history.

(56) References Cited

U.S. PATENT DOCUMENTS

| | | | | |
|---|---|---|---|---|
| 2010/0179955 | A1* | 7/2010 | Wu | G06F 16/2465 707/748 |
| 2015/0310496 | A1* | 10/2015 | Hersch | G06Q 30/0261 705/14.66 |
| 2016/0189049 | A1* | 6/2016 | Silvestri | H04W 4/20 706/52 |
| 2019/0272339 | A1* | 9/2019 | Wang | G06K 9/6298 |
| 2019/0362017 | A1* | 11/2019 | Salomon | G06N 5/02 |
| 2020/0118016 | A1* | 4/2020 | Salomon | G06F 16/2465 |

* cited by examiner

*Primary Examiner* — Robert G Bachner
(74) *Attorney, Agent, or Firm* — Holland & Hart LLP

(57) ABSTRACT

Methods, systems, and devices for determining device associations are described. Some database systems may store information related to device characteristics. Each of these devices may be operated by one or more users, and each user may operate one or more devices. In some cases, information about users may be more valuable than information about devices. As such, a system may determine probable associations between devices, where an association can correspond to operation by a same user. To determine device associations, the system may perform a machine-learning process (e.g., using probabilistic soft logic (PSL) and a hinge-loss Markov Random Field (HL-MRF) model) on input device characteristics and connection information to generate a probability density function. The probability density function may indicate associations between devices within the system. Based on one or more thresholds, the system may determine sets of associated devices and may transmit this association information for analysis or display.

20 Claims, 11 Drawing Sheets

PROBABILISTIC FRAMEWORK FOR DETERMINING DEVICE ASSOCIATIONS

FIELD OF TECHNOLOGY

The present disclosure relates generally to database systems and data processing, and more specifically to a probabilistic framework for determining device associations.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various devices (e.g., desktop computers, laptops, smartphones, tablets, or other computing systems, etc.), which may generally be referred to as "user devices."

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

As noted above, a user may access the cloud platform via one of various devices to interact with the cloud platform. For example, a user may access the cloud platform from a first device (e.g., a laptop), from a second device (e.g., a tablet), from a third device (e.g., a smartphone), etc. Additionally or alternatively, a device may be defined as a web browser on a physical device, different cookies for a physical device, or a similar cloud platform access point that a user uses to access the cloud platform. In some cases, the same user may access the cloud platform from multiple different devices (e.g., physical devices and/or cloud platform access points). It may be beneficial for the cloud platform to identify which devices belong to a single user to track user information, such as common user habits or trends. However, the devices used by a user may employ different identifiers (e.g., consistent and persistent identifiers generated for each device when it enters the platform), different features or data associated with each device (e.g., different user agent (UA) information, different Internet Protocol (IP) addresses at the same user device or at different user devices, etc.), or may not store an indication of a correlation with any single user. As such, it is difficult for the cloud platform to determine associations between different devices and, correspondingly, between sets of associated devices and specific users.

DETAILED DESCRIPTION

Figure 1:
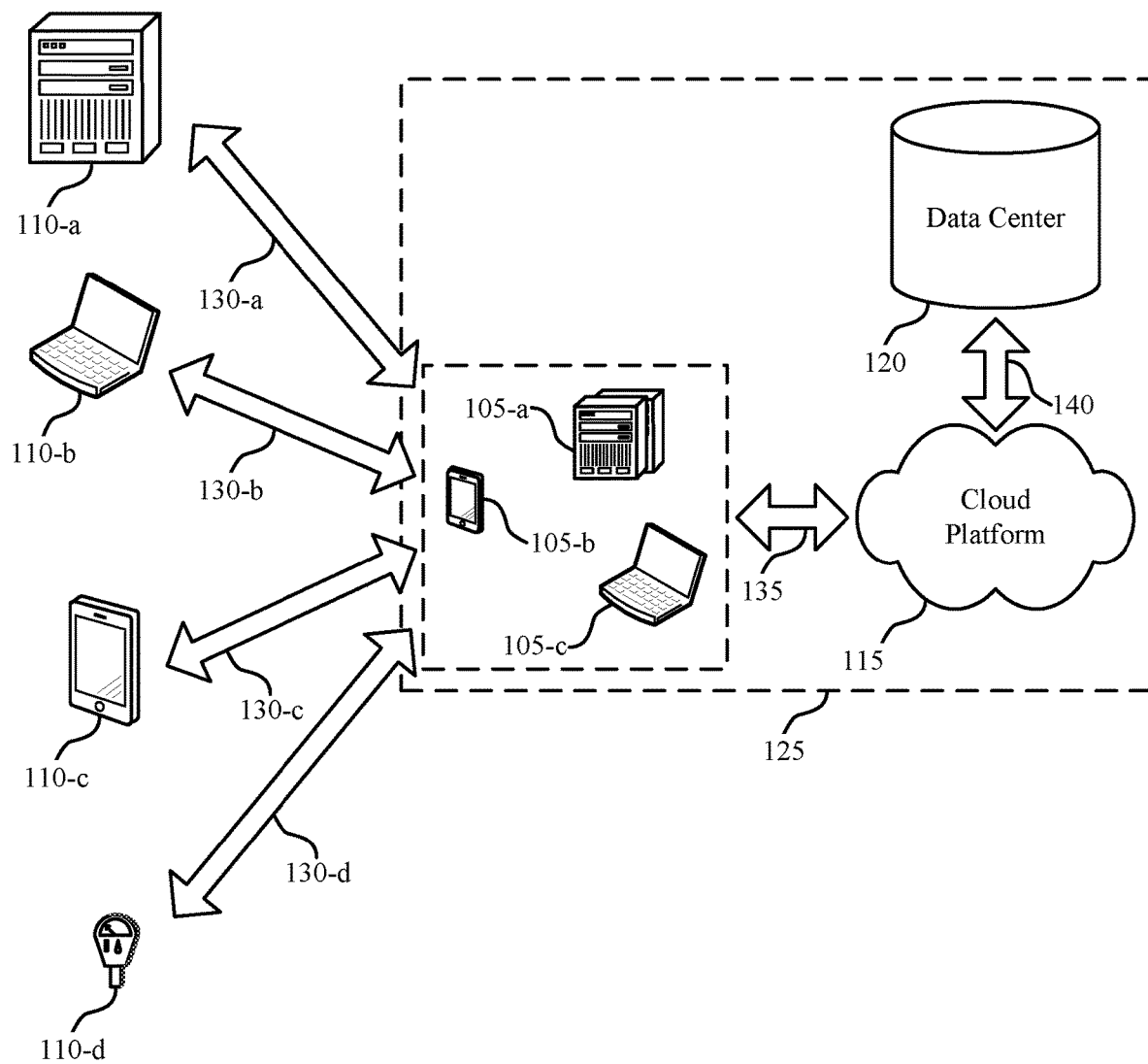
FIG. 1 illustrates an example of a system for cloud computing that supports a probabilistic framework for determining device associations in accordance with aspects of the present disclosure.

A user may access a cloud platform (e.g., via the Internet) using a device, sometimes referred to as a "user device," where the device may be an example of a physical device such as a mobile device (e.g., a cell phone or smartphone), a laptop, a desktop computer, a tablet, or some similar computing system. In other cases, a device may be defined as a web browser on one of the physical devices, one or more cookies (e.g., Hypertext Transfer Protocol (HTTP) cookies indicating small pieces of data sent from a website and stored on a device by the user's web browser) for one of the physical devices, or a similar cloud platform access point. When accessing the cloud platform and/or communicating with the cloud platform, transmissions from the devices may include one or more parameters (e.g., device characteristics) that indicate a specific user operating the device. For example, the parameters (e.g., evidence) may include indications of the user such as, but not limited to, authentication activity, user agent (UA) information, an Internet Protocol (IP) address, device activity information (e.g., browser history, purchase activity, etc.), a device type, etc. In some cases, two or more devices may be associated with a single entity (e.g., a single user, a set of users, a household, an organization, etc.), where the included parameters may indicate this association. In certain examples, additional connection information (e.g., common-sense constraints, physical locations, activity timestamps, etc.) may be known for one or more of the devices in a system that can help indicate associations between the devices.

To determine an association between multiple devices (e.g., corresponding to a single entity), a database system may receive the parameters and connection information for the devices indicating which user operates each device and may perform a machine-learning process based on the parameters and connection information to determine the association. In some cases, the database system may estimate one or more parameters of a pre-specified probability density function (e.g., using a hinge-loss Markov Random Field (HL-MRF) model) to determine the associations between devices based on the machine-learning process. For example, the estimated parameters may be stored as a set of values, and a device graph with weighted edges may be derived from the probability density function to indicate a probability (e.g., likelihood) that certain devices are associated with each other (e.g., that the associated devices have a same entity operating them). In some cases, the association between devices may be derived based on determining that the probability density function for the devices is above a threshold value. For example, if the probability that two user devices are associated with a same entity is above a certain threshold value (e.g., above 0.5 or 50%), the database system may determine (e.g., make a hard-decision) that the two devices are associated with the same entity.

The database system may determine sets of device associations based on the probability density function(s) (e.g., and the threshold value) to identify which devices are associated with which other devices. The database system may then transmit information that indicates these device associations to a separate device operated by a user. In some cases, the database system may transmit the information to the separate device based on a query received from the separate device requesting the associations of a particular device, the devices associated with a particular entity, or a combination thereof. The separate device may display the retrieved information in a user interface as a list of associated devices, a device graph, or some similar visual representation.

Aspects of the disclosure are initially described in the context of an environment supporting an on-demand database service. Additionally, a grouping scheme, a connected device graph, a device association display, and a process flow are provided to illustrate aspects of the disclosure. Aspects of the disclosure are further illustrated by and described with reference to apparatus diagrams, system diagrams, and flowcharts that relate to a probabilistic framework for determining device association.

FIG. 1 illustrates an example of a system 100 for cloud computing that supports a probabilistic framework for determining device associations in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a device (e.g., a user device), such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

A contact 110 or cloud client 105 may access the cloud platform 115 via a physical device as described above (e.g., a server, a laptop, a smartphone, a sensor, etc.). Additionally, a device may be an example of a web browser on one of the physical devices, cookies for one of the physical devices, or a similar access point to cloud platform 115. In some cases, more than one contact 110 may be associated with a single entity that accesses the cloud platform 115 using the more than one contact 110 (e.g., based on availability, to perform different processes, etc.), where the single entity may be a single user, a set of users, a household, a company or organization, or a similar entity that accesses the cloud platform 115. For example, the single entity may access the cloud platform via a first contact 110 for a first activity (e.g., reading articles), a second contact 110 for a second activity (e.g., data storage), a third contact 110 for a third activity (e.g., social media access), etc. As such, it may be beneficial to identify this association of contacts 110 (e.g., a device association) with the single entity for a variety of purposes (e.g., targeted marketing or advertising, accurate record keeping, etc.). However, the different contacts 110 may include different identifiers (e.g., consistent and persistent identifiers generated for each device when it enters the platform) that make it difficult to determine a common association with a single entity.

In some cases, the contacts 110 may include one or more characteristics (e.g., user device parameters) that indicate a specific client operating the device when accessing the cloud platform 115. For example, the characteristics, which may be referred to as parameters or evidence, may include indicators for the user such as, but not limited to, authentication activity, UA information, an IP address, device activity information (e.g., browser history, purchase activity, communication information, etc.), a device type, etc. Additionally, connection information (e.g., common-sense constraints, physical locations, activity timestamps, etc.) may be known for one or more of the cloud clients 110 that help indicate an association between devices.

To determine an association between multiple contacts 110 (e.g., corresponding to a single entity), a database system (e.g., a subsystem 125) may receive the characteristics (e.g., device parameters) and connection information for the contacts 110 indicating which user operates each device. The system may perform a machine-learning process (e.g., using an HL-MRF model) based on the characteristics and connection information. For example, the machine-learning process may enable probabilistic cross-device identity management (CDIM) for determining associations between the contacts 110. Additionally, probabilistic soft logic (PSL) may be used to generate the machine-learning model. In some cases, the database system may estimate one or more parameters of a pre-specified probability density function to determine device association based on an output of the machine-learning process. These estimated parameters may be stored as a set of values for the probability density function, and a device graph with weighted edges may be derived from the probability density function to indicate a probability (i.e., likelihood) that two contacts 110 are associated. In some cases, the association between contacts 110 may be based on determining if the probability density function for devices is above a threshold value. For example, if the probability that two contacts 110 are associated with each other (e.g., based on an association between each contact 110 and a same entity) is above a certain threshold value (e.g., above 0.5 or 50%), the database system may determine that the two contacts 110 are likely associated with each other and, accordingly, with the same entity.

The database system may determine device associations based on the probability density functions (e.g., and one or more threshold values) to identify which contacts 110 are associated with which other contacts 110. The database system may then transmit information that indicates these device associations to a separate device (e.g., a cloud client 105). In some cases, the database system may transmit the information to the cloud client 105 based on a query received from the cloud client 105. This query may request information related to the associations of a particular contact 110, the contacts 110 associated with a particular entity (e.g., a specific user, an organization, etc.), or a combination thereof.

Some conventional systems may not determine associations between different devices. In these systems, a user may use multiple devices to access the system, and the system may store information about each of these devices separately. As such, any analysis performed by the system may be performed at the device level, as opposed to the user level. This analysis may fail to capture accurate information for users that use multiple different devices, especially if different devices are used for different specific tasks or processes.

In contrast, the system 100 may support determining associations across different devices (e.g., contacts 110) based on an HL-MRF model. As such, rules about relationships between features (e.g., connection information) and observed data (e.g., parameters) may be specified. PSL may allow a transition from these rules to defined functions and may specify a metric on the satisfaction of these rules (e.g., weighted edges on a device graph satisfying a threshold). For example, the rules may induce a weighted potential (e.g., field) on an entire state space of edges and combinations between the different edges. By construction, the resulting optimization problem for determining the association between devices may be convex. Accordingly, determining device associations based on an HL-MRF model (e.g., a probabilistic framework) may provide more efficient and accurate techniques to determine patterns for users. Additionally, the probabilistic framework may enable all of a user's information across multiple devices to be analyzed together. The probabilistic framework may also support one-to-one mapping (1:1) of logical rules to a contact 110.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In some cases, the probabilistic determination of device associations may enable advertisers and marketing companies to better target certain contacts 110 of an entity with appropriate information. For example, an advertiser may not want to spam a single entity with multiple advertisements or the same advertisement on multiple contacts 110 (e.g., devices) belonging to the single entity. Accordingly, based on determining which contacts 110 are used by the same, single entity, the advertiser may send an advertisement to one contact 110 or a subset of contacts 110 for the single entity. Additionally or alternatively, a marketing company may desire to determine habits or trends for users (i.e., individual humans) as opposed to devices. The probabilistic determination of device associations may allow marketers to accurately aggregate data for individual users across multiple devices and perform analysis on these aggregate sets of data. Furthermore, the marketers may specifically target certain contacts 110 of a single entity to improve the user experience for the single entity. For example, based on the probabilistic determination, a marketing company may determine that the single entity reads one type of article on a first contact 110 (e.g., a smartphone) and reads a second type of article on a second contact 110 (e.g., a laptop).

Accordingly, the marketing company may offer products on each contact 110 associated with a corresponding type of article that the entity reads on that contact 110. Additionally, the probabilistic determination for CDIM may support reaching a customer (e.g., an entity) if a credit card fraud is detected for the customer or if a flight is determined to be late by identifying appropriate contacts 110 for the customer.

Figure 2:
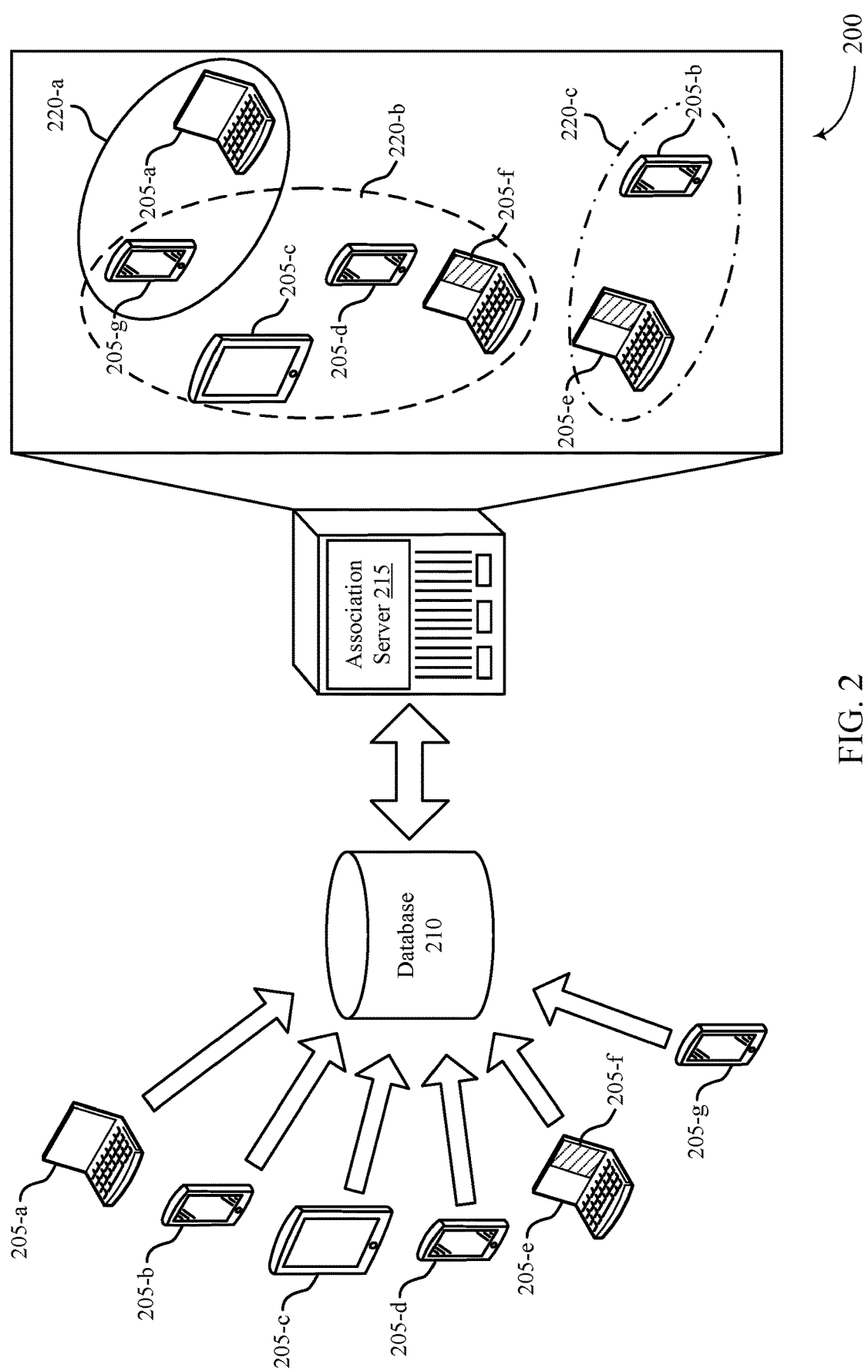
FIG. 2 illustrates an example of a grouping scheme that supports a probabilistic framework for determining device associations in accordance with aspects of the present disclosure.

FIG. 2 illustrates an example of a grouping scheme 200 that supports a probabilistic framework for determining device associations in accordance with aspects of the present disclosure. In some examples, grouping scheme 200 may implement aspects of system 100, as described above with reference to FIG. 1. Grouping scheme 200 may include multiple devices 205 that an association server 215 is attempting to divide into logical groups 220 based on associations between the devices 205. In some cases, each group 220 of associated devices 205 may also be associated with a single entity that operates the group 220 of corresponding devices 205. Association server 215 may map between the set of devices 205 (D) to a set of labels (L) for the devices 205. These labels may correspond to different users, groups of users, households, organizations, etc. The association server 215 may be an example of an application server, a database server, a server cluster, a container, a virtual machine, a user device, or any other device or system for processing device information to determine associations between the devices 205.

As described herein, the set of devices 205 may include physical devices, as described above with reference to contacts 110 of FIG. 1. For example, device 205-$a$ may be a laptop, device 205-$b$ may be a smartphone, device 205-$c$ may be a tablet, device 205-$d$ may be a second smartphone, and device 205-$g$ may be a third smartphone. Additionally, the set of devices 205 may include access points to a cloud platform or the Internet within a physical device. For example, device 205-$e$ and device 205-$f$ may be two separate browsers within the same laptop or two separate cookies indicating users sending data on the same laptop. In some cases, each device 205 may be associated with one or more users (e.g., multiple members of a family may use the same tablet), and each user may be associated with one or more of the devices 205 (e.g., a single person may own and operate a laptop, a tablet, and a smartphone). As such, it may be beneficial to determine these device associations to better target a user for advertisement, marketing, security, notification, or additional purposes.

Association server 215 may collect data from the set of devices 205 via a database 210 that stores the data. In some cases, the association server 215 may analyze data from multiple different databases 210 or data management systems. The association server 215 may analyze the device data in batches or in a single procedure. In some examples, the association server 215 may periodically or aperiodically perform updates to the data analysis based on ongoing device activities, new devices 205 or users in the system, or any other real-time or pseudo-real-time updates to the system. In some systems, the association server 215 may target the set of devices 205 for corresponding communications (e.g., to communicate information about device associations).

The data (e.g., device characteristics) collected by database 210 about a device 205 may be represented as a vector. For example, for a device $d_i$, the vector may be given as $y_i = (d_i | e_i)$, where $e_i = (e_{i1}, e_{i2}, \ldots, e_{im})$ is an m-dimensional feature vector referred to as "evidence." This evidence may include authentication activity, UA information, device types, IP addresses, events (e.g., browsing activity, purchasing activity, etc.), or a combination thereof for each device 205. In some cases, the evidence may be modified based on some constraints (e.g., time between website visits). Additionally, some evidence may be weighted stronger than other evidence and may be used in training data sets (e.g., login or authentication information that is more definitively tied to a specific user). In some cases, different types of data may be used differently in the machine-learning process. For example, some data (e.g., login or authentication information) may be "trusted" data indicating known associations and can be used as defined or pre-set associations. Other data (e.g., device activities, location information, etc.) may be used as indicators of associations, but may not be used as definitive association information. The association server 215 may determine a neighborhood (N) of a device 205 that indicates which other devices 205 are near to it in a vector space. Accordingly, the devices 205 may be labeled according to a function L(N) that takes a corresponding neighborhood as its argument. In some cases, the neighborhood may be determined based on IP-Timestamps (IPHist) for each of the devices 205, geographic data, or any other evidence or combination thereof.

As described herein, association server 215 may perform a machine-learning process based on the evidence collected, heuristics, and common-sense constraints to determine which devices 205 are associated with each other. For example, if a first device 205 is associated with a second device 205, and the second device 205 is associated with a third device 205, it stands to reason that the first device 205 may be associated with the third device 205. In some cases, the machine-learning process may include generating an HL-MRF model to indicate the device associations. Additionally, PSL may be used to create the HL-MRF model and an associated optimization problem for determining the device associations.

PSL is a language for turning logical statements into one or more functions. For example, PSL may make HL-MRFs easy to define using a syntax based on first-order logic that enables users to easily apply many common modeling techniques (e.g., domain and range constraints, blocking and canopy functions, aggregate variables defined over other random variables, etc.), which may also enable use of HL-MRF s for large, relational data sets. PSL may use one or more rules (e.g., logical rules and arithmetic rules) to create the HL-MRF. As shown below, through examples of rules for PSL, an intersection or union between two variables may be turned into a function:

$$A \cap B \rightarrow \max\{A+B-1,0\} \qquad (1)$$

$$A \cup B \rightarrow \min\{A+B,1\} \qquad (2)$$

$$\neg A \rightarrow 1-A \qquad (3)$$

Additionally, a logical implication may be converted by using the equality:

$$A \cap B \rightarrow C = \neg A \cup \neg B \cup C \qquad (4)$$

The logical implication $A \cap B \rightarrow C$ may then become:

$$\min\{2-A-B+C,1\} \qquad (5)$$

Accordingly, through PSL, the variables above (e.g., A, B, C) may take values in the range [0, 1]. The result may indicate the "truthfulness" of the implication. For example, for A=0.8, B=0.9, and C=0.5, min{2−A−B+C, 1}=0.8, indicating that there is an 80% chance the implication is true. Additionally or alternatively, the distance to satisfy the implication may be given as:

$$1-\min\{2-A-B+C,1\} = \max\{A+B-C-1,0\} \qquad (6)$$

With the same values in the example given above, the distance to satisfy the implication may be 0.2 or 20%.

An example of a rule defined for associating a user device 205 to an identity for user device associations may be specified (e.g., by a modeler or association server 215). For example, the rule may be given as:

$$\text{IPHist}(d_1,i_1) \cap \text{IPHist}(d_2,i_2) \cap \text{Sim}(i_1,i_2) \rightarrow \text{SameLabel}(d_1,d_2) \quad (7)$$

Neighborhoods may be formed in the body of the rule, and the label, L, may be determined by the head of the rule. Accordingly, both the observed data and the relationships between the evidence may be reasoned through the rule. As such, these rules may support accurate determinations of labels, resulting in significant associations between devices based on the device characteristics (e.g., the observed data). Additionally, different rules than the rules described above may be defined that result in different potentials and a different probability density function. As such, the framework, as described herein, may apply to any defined rule for the PSL.

By creating logical rules similar to shown above, association server 215 may generate a collection of K functions of the form:

$$\varphi_j(Y|X) = \max\{l_j(Y|X),0\}^{p_j} \quad (8)$$

where $l_j$ is some linear function of the observed data X and the decision variables Y. Additionally, $p_j \in \{1,2\}$ may indicate how strictly violations of the statement are penalized. In some cases, each statement may be assigned a relative weight ($\lambda_j$) to represent an importance for satisfying the statement. Accordingly, a total weighted "distance to satisfaction" for a statement may be given as:

$$f_\lambda(Y|X) = \sum_{j=1}^{K} \lambda_j \varphi_j(Y|X) \quad (9)$$

Based on the above derived statements, functions, and rules, association server 215 may create a probability density function that characterizes how likely a configuration of (Y|X) is:

$$P(Y|X) = \frac{1}{Z(\lambda)} \exp\{-f_\lambda(Y|X)\} \quad (10)$$

where Z is a normalization constant for the weight ($\lambda$). Accordingly, the probability density function may then be used to find a most likely configuration:

$$\underset{(Y|X) \in [0,1]^{n+m}}{\arg\min} P(Y|X) = \underset{(Y|X) \in [0,1]^{n+m}}{\arg\min} f_\lambda(Y|X) \quad (11)$$

Weights for each logical rule may be determined, as well as an optimal assignment of $Y \in [0,1]^n$ given an observed X. The labels resulting from such a process may form a fully connected device graph that the association server 215 may use to determine the likelihood of different device associations. In some cases, such a device graph may be stored as vectors or values in a table in memory of the association server 215. The association server 215 may use the device graph to make hard-decisions on which devices 205 are associated with which other devices 205 (e.g., at a given level of probability).

As shown, association server 215 may use the HL-MRF model probability density function derived above based on PSL functions to determine groups 220 of the devices 205. For example, devices 205-a and 205-g may have a high probability of being associated with the same user (e.g., entity) based on the collected evidence and known information (e.g., neighborhoods) and may be grouped together in group 220-a. Similarly, devices 205-c, 205-d, 205-f, and 205-g may have a high probability of having a same user and may be grouped together in group 220-b. Additionally, devices 205-b and 205-e may also have a high probability of having a same user and may be grouped together in group 220-c. In some cases, association server 215 may determine the groups 220 (e.g., associations) based on one or more connected device graphs for the devices 205. The association server 215 may surface the determined association information for display at a device 205 or may perform one or more processes or analyses based on the association information. In some cases, the association server 215 may store indications of the determined device 205 associations at database 210. Additionally or alternatively, the association server 215 may periodically or aperiodically (e.g., based on new data or a trigger) update the HL-MRF model probability density function, the device graph, the device 205 associations, or some combination of these. In this way, the association server 215 may handle new devices 205 added to the system, new users added to system, changing associations between devices (e.g., a user may get a new phone or trade in a laptop), or new evidence affecting the underlying model. Such updates may improve the accuracy and scope of the probabilistic framework for determining device associations. In some cases, for efficient iterative updates, the application server 215 may not reprocess all of the device data to update the HL-MRF model probability density function, and instead may process small batches of data (e.g., newly received activity data for devices 205) against the existing function to determine an updated HL-MRF model probability density function.

In some cases, grouping scheme 200 may employ neural networks, deep learning, or both to determine associations between one or more devices for a single entity. A neural network may be trained to learn relationships between features of the devices. The neural network may then output a vector for each device in a space with definable distances.

Figure 3A:
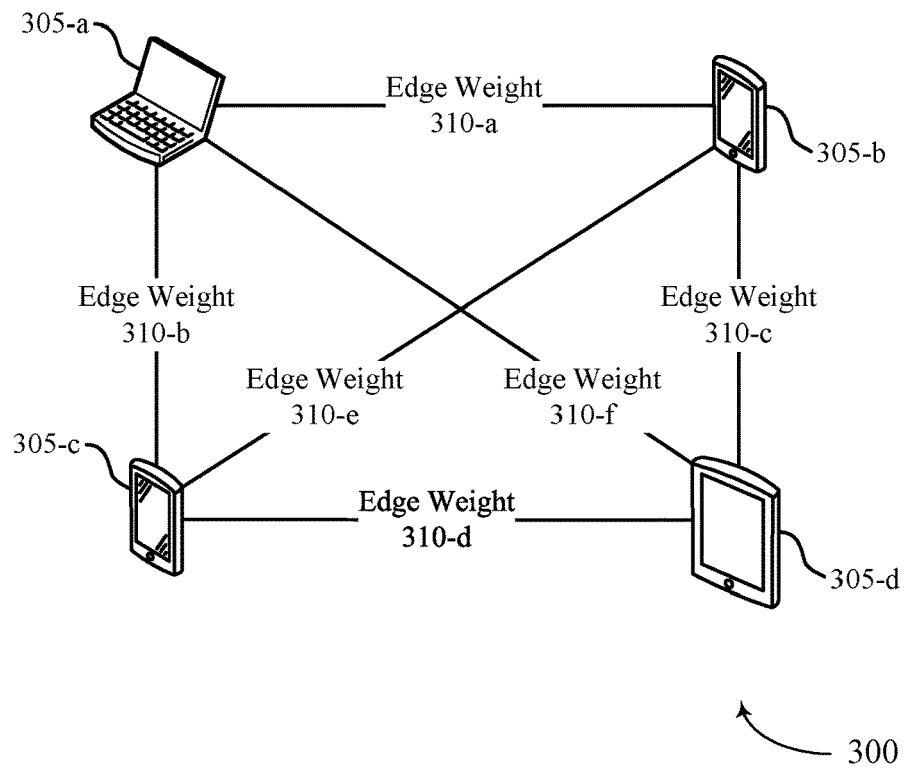
FIGS. 3A and 3B illustrate examples of connected device graphs that support a probabilistic framework for determining device associations in accordance with aspects of the present disclosure.
Figure 3B:
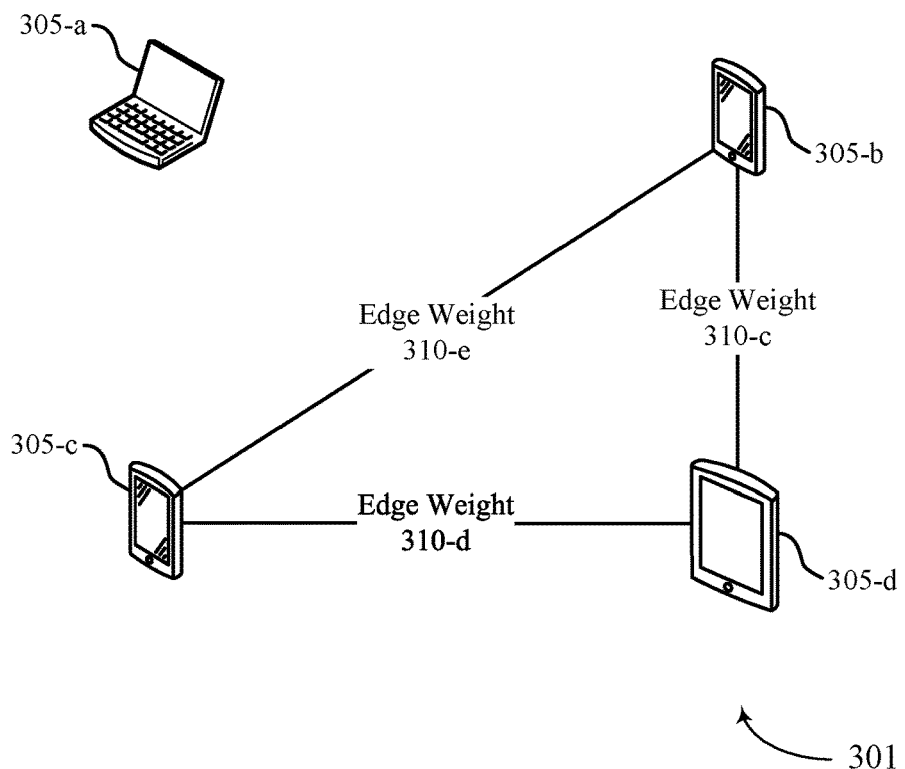

FIGS. 3A and 3B illustrate examples of connected device graphs 300 and 301 that support a probabilistic framework for determining device associations in accordance with aspects of the present disclosure. In some examples, connected device graphs 300 and 301 may implement aspects of system 100. Connected device graphs 300 and 301 may be determined based on a probability density function as described above with respect to FIG. 2. As shown, probabilities that a set of devices 305 are connected are determined and depicted in the connected device graphs 300 and 301. For example, a database may contain data from a first device 305-a, a second device 305-b, a third device 305-c, and a fourth device 305-d. An association server may then determine which devices have a high probability of being associated with one another. In some cases, such an association may correspond to devices 305 being operated by a same user (e.g., entity).

Labels determined by a probability density function (e.g., using HL-MRFs) may result in connected device graph 300. An edge weight 310 ($w_{ij}$) of an edge between two devices 305 (i.e., nodes) in the graph may represent the likelihood that the devices are associated, where an edge weight of 1 may indicate that an association between the devices 305 is certain and an edge weight of 0 may indicate that the devices 305 are not associated. The first device 305 may be given as $d_i$ and the second device 305 may be given as $d_j$ such that $1 \leq i$, $j \leq D$, and $i \neq j$. D may represent the total number of devices 305 in the connected device graph 300. Additionally, the number of edges (E) may be given as:

$$E = \frac{D(D-1)}{2} \sim O(D^2) \qquad (12)$$

In some cases, E may indicate a maximum possible number of edges in connected device graph 300 (e.g., including self-edges for a device 305). Each weighted edge 310 may be given as a percentage to indicate the likelihood that two devices 305 are connected (e.g., operated by the same user or group of users). In some cases, each weighted edge 310 may be further based on limits on the number of devices 305 included in the connected device graph and/or determined associations. Additionally or alternatively, the weights may increase or discount links between certain types of devices, such as portable devices (e.g., smartphones) and non-portable devices (e.g., desktops). In some cases, the association server may determine if two devices 305 are associated with each other based on their edge weight 310 and a threshold value. For example, if the edge weight 310 of an edge is equal to or above a threshold value, the association server may determine that the devices 305 corresponding to the nodes of that edge are associated devices. This threshold value may be pre-determined, dynamically determined (e.g., based on device characteristics or features of the system), or user-defined. In some cases, for a sufficiently large number of devices 305 (e.g., D>a threshold number of devices 305) in a system, not all edges may be scored such that an edge weight 310 is determined between each device 305. Rather, smaller blocks or sub-graphs of devices 305 may be created, and these smaller blocks or sub-graphs may be scored instead to determine edge weights 310 between the devices 305 in each smaller block or sub-graph.

Connected device graph 301 may illustrate the association server "cutting" the connected device graph 300 illustrated in FIG. 3A to indicate which devices 305 are most likely associated (e.g., operated by the same user) based on their edge weights 310 exceeding (or being equal to) a threshold. For example, edge weights 310-c, 310-d, and 310-e may have weights greater than or equal to a threshold edge weight (e.g., their probabilities may be higher than 0.5, or 50%), and, as such, the association server may determine devices 305-b, 305-c, and 305-d are associated devices. In one specific example, this association between devices 305-b, 305-c, and 305-d determined in the "cut" device graph may indicate that these three devices 305 are operated by a same user (e.g., a first user). Edge weights 310-a, 310-b, and 310-f from connected device graph 300 may be below the threshold edge weight and, as such, these edges may be removed from the "cut" connected device graph 301. Removing these edges may indicate that an association is determined not to exist (e.g., is likely not to exist) between the devices 305 corresponding to the nodes of the removed edges. Based on removed the edges between device 305-a and the other three devices 305, the "cut" connected device graph 301 may indicate that device 305-a is unassociated with devices 305-b, 305-c, and 305-d (e.g., operated by a different, or second, user). In some cases, additional constraints may be taken into account when determining connected device graph 301 (e.g., the number of vertices in connected device graph 301, a maximum or minimum number of devices 305 per association, a maximum or minimum number of associations per device 305, a maximum or minimum number of total associations in the device graph, etc.).

Additionally, in some examples, the system may infer higher level constructs from a device graph (e.g., corresponding to different layers or functions). In some cases, these constructs may not be entities defined or contained in the graph, but instead may relate to certain entities in the graph. For example, after cutting the graph, the resulting connected device graph 301—with device sub-graphs defined by the still connected devices 305—may contain devices 305 and users (e.g., where the users are defined by the remaining associations via edge connections). However, the system may determine information about additional entities, such as groups of users (e.g., households, organizations, etc.), from the device graph. For example, based on the spacing of the device associations in the device graph, the system may determine associations between device associations, where these additional associations may correspond to defined groups of users. Alternatively, rather than infer these additional connections, information about groups of users may be utilized for the machine-learning process. For example, associations of users based on a household or organization may be included as observed data when performing machine-learning.

In some cases, based on the connected device graphs, queries may be run against the graphs to determine the associations with functions u and d, where u indicates a user that may operate one or more of the devices (d). Device 305-a may be referred to as $d_1$, device 305-b may be referred to as $d_2$, device 305-c may be referred to as $d_3$, and device 305-d may be referred to as $d_4$. In the example of connected device graph 301, $u(d_2)=u(d_3)=u(d_4)=\{u_1\}$ and $u(d_1)=\{u_2\}$. In some cases, the query for the device associations may be received at the association server from a user device. The query may request generic association information or may request association information for a specific association or device 305. In a first example, a query may request generic association information for connected device graph 301. Running the query against the graph may result in a list of sets of associated devices 305. In a second example, a query may request the devices 305 associated with a specific entity. For example, the query may request all devices associated with user $u_1$. The association server or a database receiving the query may respond with indications of devices 305-b, 305-c, and 305-d based on these devices 305 being associated with user $u_1$. In some cases, the query response may also indicate a probability that the list of associated devices 305 is correct, or individual probability values indicating a confidence score for each device 305 (e.g., based on how likely it is that each particular device 305 is associated with the user specified in the query). In a third example, a query may request the devices 305 associated with a specific device 305. For example, the query may request all devices associated with device $d_3$ (i.e., device 305-c). The query response may indicate the associated devices 305-b and 305-c and, in some cases, may include the corresponding edge weights 310-e and 310-d or other values indicating the strength of the association(s).

Figure 4:
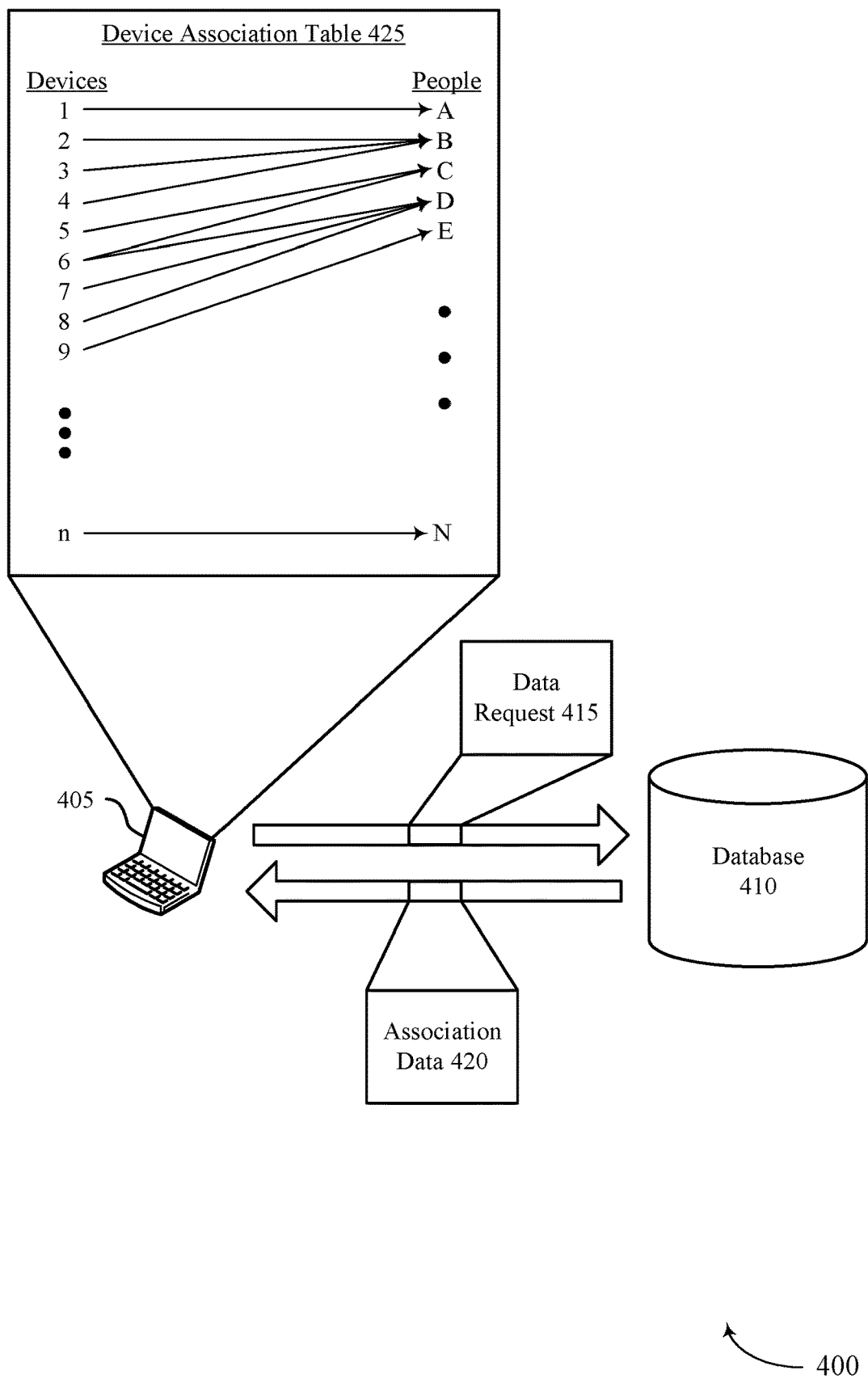
FIG. 4 illustrates an example of a device association display that supports a probabilistic framework for determining device associations in accordance with aspects of the present disclosure.

FIG. 4 illustrates an example of a device association display 400 that supports a probabilistic framework for determining device associations in accordance with aspects of the present disclosure. In some examples, device association display 400 may implement aspects of system 100. The device association display 400 may be based on the underlying processes described with respect to FIGS. 1 through 3. For example, database 410 or its components—such as an association server 215—may determine device associations based on stored device data, ongoing device activities, device information received from external systems, or some combination of these. The database 410 may make decisions on device associations based on an iterative machine-learning process and one or more identified threshold values or association constraints. The database 410 may store the determined device associations in memory (e.g., in a device graph, in a lookup table, or separately with information about each of the devices) and may periodically or aperiodically update the stored associations based on new evidence, users, devices, thresholds, constraints, or any combination thereof.

In some systems, a device 405 may transmit a data request 415 to the database 410 or a corresponding association server to retrieve association data 420 (e.g., association information). This data request 415 may be an example of a query message. In some cases, a user (e.g., an administrative user) operating the device 405 may input the specifics of the data request 415. In other cases, the data request 415 may be automatically triggered, for example, based on an application running on the device 405. The database 410 may receive the data request 415 and may identify one or more device associations based on the parameters, arguments, or logic contained in the data request 415.

The database 410 may transmit association data 420 to device 405 in response to the data request 415. In some cases, the device 405 may receive the association data 420 and may store the association data 420 in memory. This association data 420 may be used by the device 405 for entity analysis (e.g., determining information or insights on a user level, a household level, an organization level, etc.). In some implementations, the device 405 may display contents of the association data 420 in a user interface. For example, the device 405 may display a device association table 425. The device association table 425 may indicate which devices in the system are associated with one another (e.g., with reference to a common entity, such as a person). For example, as illustrated, device 1 may be operated by person A, devices 2, 3, and 4 may be operated by person B, device 5 may be operated by person C, device 6 may be operated by both persons C and D, devices 7 and 8 may be operated by person D, device 9 may be operated by person E, etc., such that n devices in the system are defined for N people.

In some cases, a user operating device 405 may interact with the device association table 425. For example, if the user knows the correct device associations for one or more devices and/or people, the user may modify the device association table 425. In one specific example, the user may select a displayed association and may delete or modify the association, or the user may create a new association. In these cases, such modifications may trigger a message to the database 410 indicating the modification to the device associations. The database 410 may update the stored device associations in memory and, in some cases, may update the machine-learning process, the probability density model, the device graph, or some combination of these based on the updated association information. Such modifications to determined device association information may require a certain user authorization level or security clearance.

In some cases, the underlying models may be used for new devices or entities added to the system. For example, the database 410 may receive information corresponding to additional devices, users, groups of users, or any combination thereof. The database 410 may predict associations between these new devices and entities and any devices and entities previously stored in the system using the previously determined probability density function. In some cases, the database 410 may iteratively update the machine-learning process based on this new information for improved device association accuracy and reliability.

Figure 5:
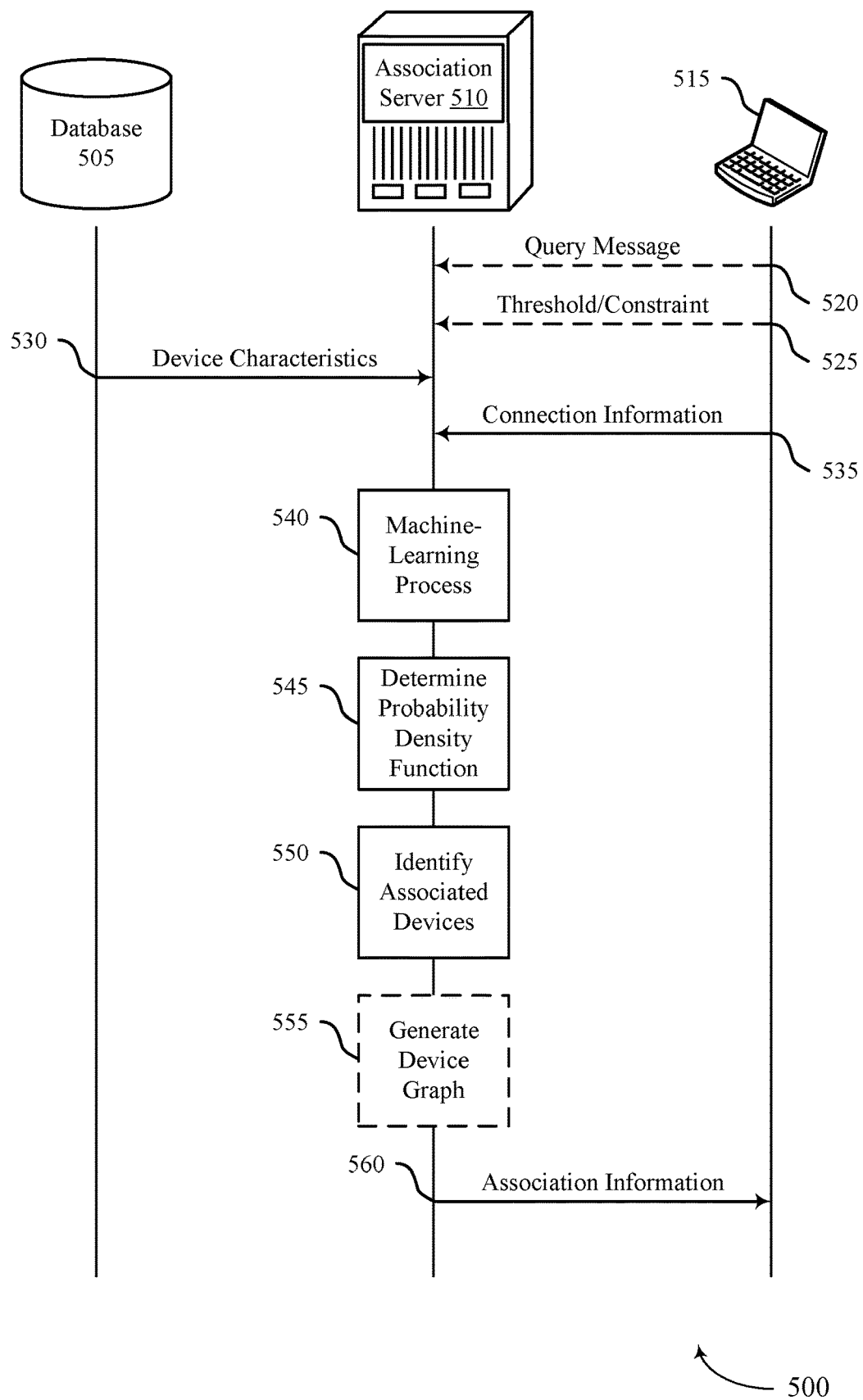
FIG. 5 illustrates an example of a process flow that supports a probabilistic framework for determining device associations in accordance with aspects of the present disclosure.

FIG. 5 illustrates an example of a process flow 500 that supports a probabilistic framework for determining device associations in accordance with aspects of the present disclosure. In some examples, process flow 500 may implement aspects of system 100. The process flow 500 may include a database 505, which may be an example of a database 210 or 410, a data center 120, or one or more data management systems; an association server 510, which may be an example of an association server 215 or any data processing device or system for determining device associations; and a device 515, which may be an example of a cloud client 105 or device 405. The process flow 500 may illustrate a method for determining device associations for improved data analysis. Alternative examples of the following may be implemented, where some steps are performed in a different order than described or are not performed at all. In some cases, steps may include additional features not mentioned below, or further steps may be added.

In some cases, at 520, device 515 (e.g., a user device) may transmit a query message to the association server 510 (e.g., via database 505 or some other system). The query may indicate a particular device or entity (e.g., a single user, a set of users, a household, an organization, etc.) to retrieve association information for. For example, the query may request information about any devices associated with a specific user, household, or organization.

Additionally or alternatively, at 525, the device 515 may transmit a weight threshold for association, a constraint for a constraint optimization process, or both to the association server 510. The weight threshold may specify a threshold edge weight for "cutting" a device graph to make decisions on device associations. The constraint may be an example of a threshold number of total device associations, a threshold number of associations per device, a threshold number of associations per type of device, a threshold number of devices per association, or some combination of these or similar constraints. These thresholds and constraints may be used by the association server 510 to determine the device associations. In some cases, rather than receiving these from device 515, the association server 510 may retrieve these values from the database 505 or may store pre-determined or pre-configured thresholds and/or constraints.

At 530, the association server 510 may receive, from the database 505, a set of device characteristics. These characteristics may correspond to a set of devices, where each device is associated with a respective set of device characteristics. In some cases, the device characteristics may include authentication activity information, UA information, device types, IP addresses, geographic location information, web activity information, activity timestamps, or any combination of these or other relevant device characteristics. The set of devices may include mobile devices, laptops, desktops, Internet of Things (IoT) devices, Internet of Everything (IoE) devices, web browsers, web cookies, or any combination of these or other devices. In a first implementation, the database 505 may transmit the device characteristics for an initial machine-learning process at the association server 510 (e.g., either in batches or for a full set of stored data). In a second implementation, the association server 510 may retrieve the device characteristics from the database 505 based on a triggered machine-learning process (e.g., based on receiving a query message from device 515 or based on some other trigger). In a third implementation, the association server 510 may receive device characteristics in real-time or in iterative batches (e.g., according to a schedule). For example, the database 505 may push new or unprocessed device characteristics to the association server 510 at a set time each day for updating device associations.

At 535, the association server 510 may receive connection information for the set of devices. The association server 510 may receive the connection information from a device 515 (e.g., operated by an administrative user), from the database 505, or from memory. This connection information may include pre-defined (e.g., hardcoded) device associations, common sense constraints, or any other connection information related to device associations that may not be based on device activities or parameters. The connection information may be dynamic, semi-static, or pre-defined.

At 540, the association server 510 may perform a machine-learning process using the set of device characteristics and the connection information as inputs. For example, the association server 510 may use PSL to generate an HL-MRF model. At 545, the machine-learning process may output one or more probability density functions for device association.

At 550, the association server 510 may identify sets of associated devices based on the one or more probability density functions. In some cases, identifying the sets of associated devices may be further based on one or more thresholds or constraints (e.g., the thresholds and/or constraints received at 525).

At 555, in some cases, the association server 510 may generate a device graph based on the probability density function(s) for device association. This device graph may include a number of nodes and weighted edges, where each pair of nodes in the graph is connected by an edge. The nodes may represent devices within the system (e.g., as specified by the device characteristics) and each weighted edge may correspond to the probability that two devices (e.g., represented by the nodes for that edge) are associated. In some cases, the association server 510 may remove (i.e., "cut") a set of weighted edges from the device graph based on one or more association constraints (e.g., a weighted edge threshold, a maximum number of associations or associated devices, etc.). The remaining device sub-graphs after the edge removal process may correspond to the sets of associated devices. For example, after cutting the edges of the graph according to some association parameters, the devices that are still connected in the resulting sub-graphs are determined to likely be associated with each other (e.g., and with a same entity).

At 560, the association server 510 may transmit, to the device 515, information corresponding to at least one set of the identified sets of associated devices. For example, in a first case, the association server 510 may transmit information indicating all of the determined device associations. In a second case, the association server 510 may transmit information indicating the devices associated with a specific device or entity (e.g., based on the query message received at 520). Additionally or alternatively, this association information may include other information, such as confidence indices corresponding to the associations, specific device characteristics for the devices, information about the probability density function or functions, information about the thresholds or constraints used for determining the associations, or any combination of this or other relevant information. The device 515 may process, analyze, and/or display the received association information.

Figure 6:
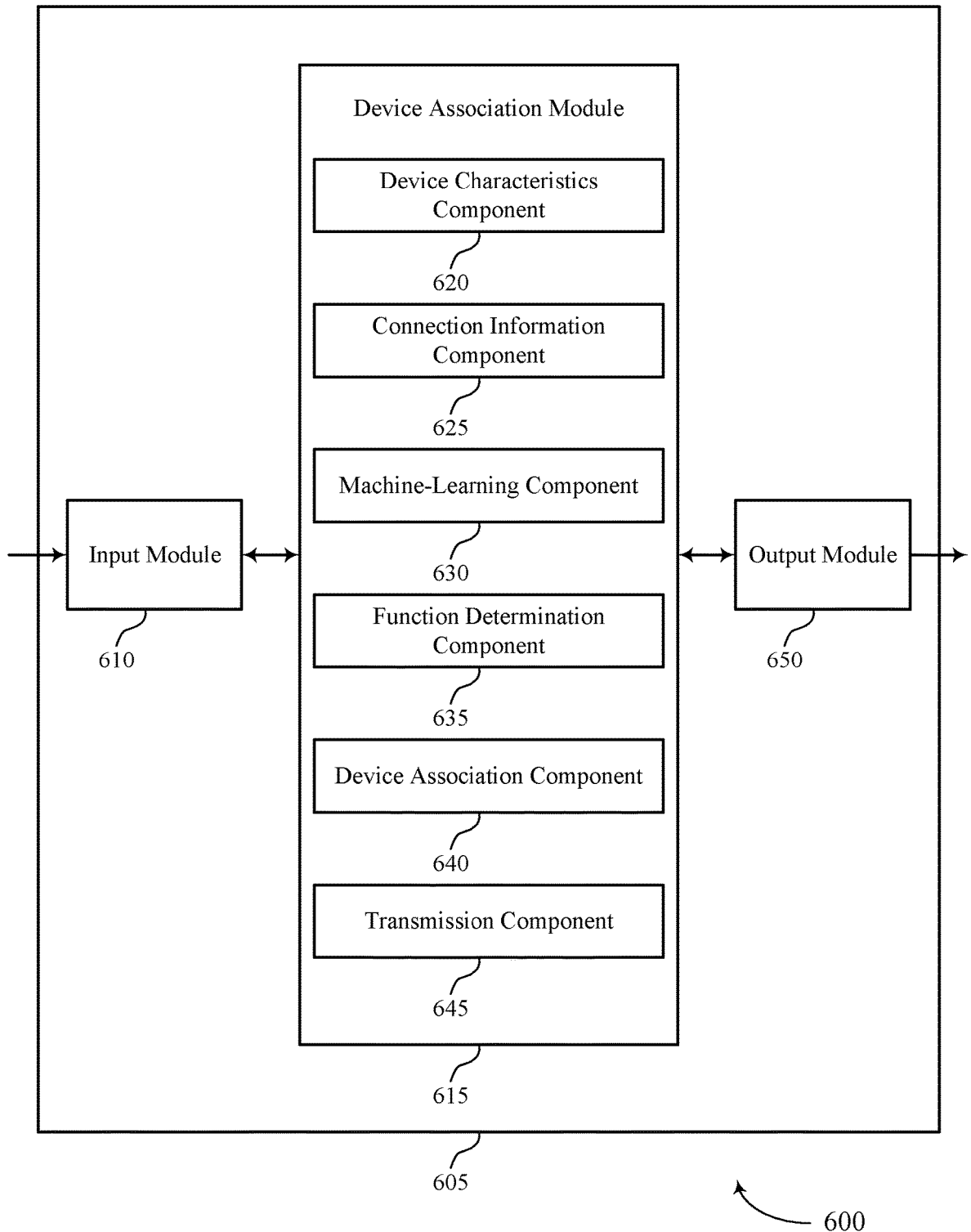
FIG. 6 shows a block diagram of an apparatus that supports a probabilistic framework for determining device associations in accordance with aspects of the present disclosure.

FIG. 6 shows a block diagram 600 of an apparatus 605 that supports a probabilistic framework for determining device associations in accordance with aspects of the present disclosure. The apparatus 605 may include an input module 610, a device association module 615, and an output module 650. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the data retention module 615 to support data retention handling for data object stores. In some cases, the input module 610 may be a component of an input/output (I/O) controller 815 as described with reference to FIG. 8.

The device association module 615 may include a device characteristics component 620, a connection information component 625, a machine-learning component 630, a function determination component 635, a device association component 640, and a transmission component 645. The device association module 615 may be an example of aspects of the device association module 705 or 810 described with reference to FIGS. 7 and 8.

The device association module 615 and/or at least some of its various sub-components may be implemented in hardware, software executed by a processor, firmware, or any combination thereof. If implemented in software executed by a processor, the functions of the device association module 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The device association module 615 and/or at least some of its various sub-components may be physically located at various positions, including being distributed such that portions of functions are implemented at different physical locations by one or more physical devices. In some examples, the device association module 615 and/or at least some of its various sub-components may be a separate and distinct component in accordance with various aspects of the present disclosure. In other examples, the device association module 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The device characteristics component 620 may receive, from a database, a set of device characteristics corresponding to a set of devices, where each device of the set of devices is associated with a respective set of device characteristics of the set of device characteristics. The connection information component 625 may receive connection information for the set of devices.

The machine-learning component 630 may perform a machine-learning process based on the set of device characteristics and the connection information. The function determination component 635 may determine a probability density function for device association based on an output of the machine-learning process. The device association component 640 may identify multiple sets of associated devices based on the probability density function for device association.

The transmission component 645 may transmit, to a device, information for display corresponding to at least one set of the identified sets of associated devices.

The output module 650 may manage output signals for the apparatus 605. For example, the output module 650 may receive signals from other components of the apparatus 605, such as the data retention module 615, and may transmit these signals to other components or devices. In some specific examples, the output module 650 may transmit output signals for display in a user interface, for storage in a database or data store, for further processing at a server or server cluster, or for any other processes at any number of devices or systems. In some cases, the output module 650 may be a component of an I/O controller 815 as described with reference to FIG. 8.

Figure 7:
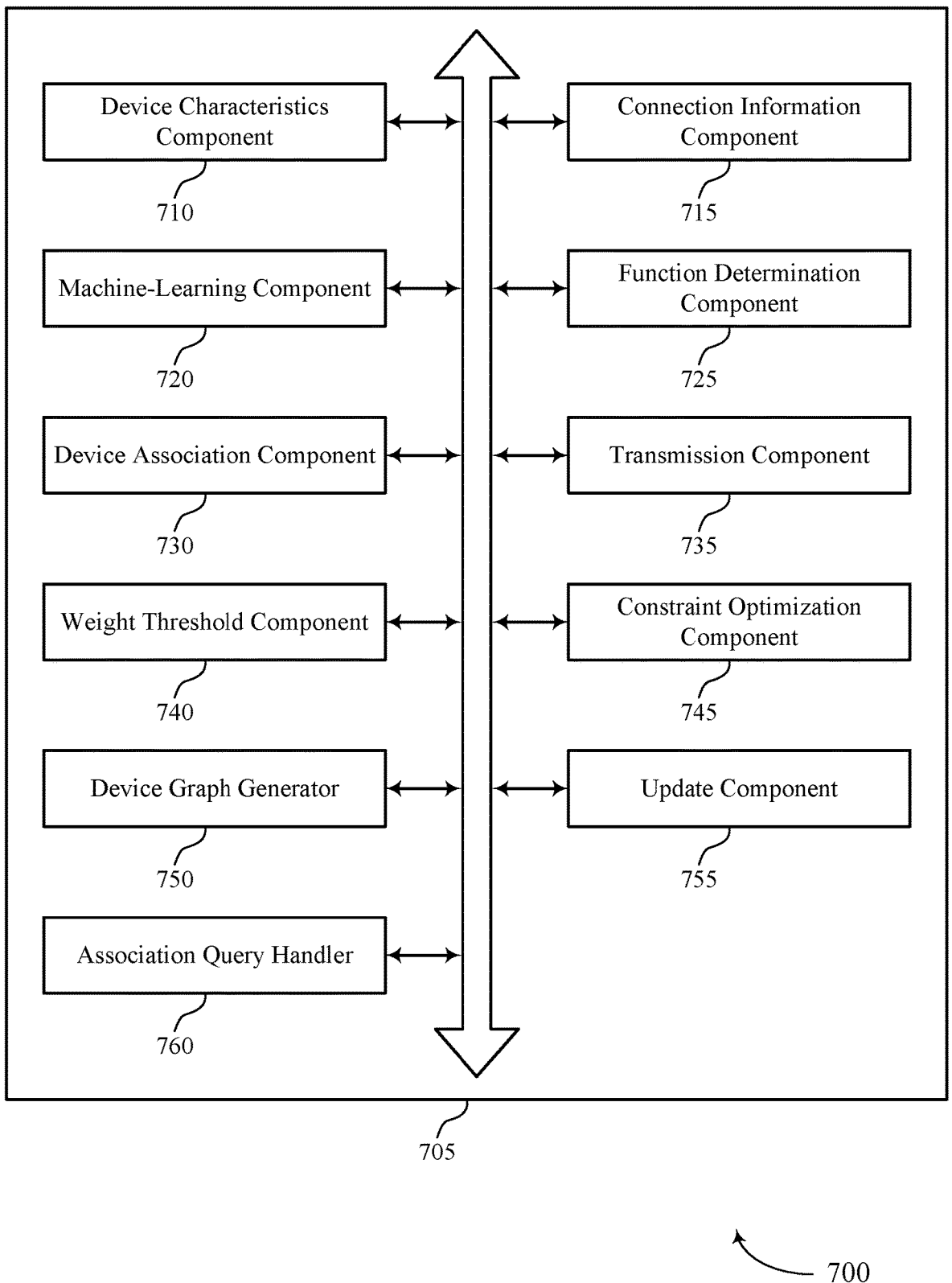
FIG. 7 shows a block diagram of a device association module that supports a probabilistic framework for determining device associations in accordance with aspects of the present disclosure.

FIG. 7 shows a block diagram 700 of a device association module 705 that supports a probabilistic framework for determining device associations in accordance with aspects of the present disclosure. The device association module 705 may be an example of aspects of a device association module 615 or a device association module 810 described herein. The device association module 705 may include a device characteristics component 710, a connection information component 715, a machine-learning component 720, a function determination component 725, a device association component 730, a transmission component 735, a weight threshold component 740, a constraint optimization component 745, a device graph generator 750, an update component 755, and an association query handler 760. Each of these modules may communicate, directly or indirectly, with one another (e.g., via one or more buses).

The device characteristics component 710 may receive, from a database, a set of device characteristics corresponding to a set of devices, where each device of the set of devices is associated with a respective set of device characteristics of the set of device characteristics. In some cases, the set of device characteristics includes authentication activity information, user agent information, device types, IP addresses, geographic location information, web activity information, activity timestamps, or a combination thereof. In some cases, the set of devices includes mobile devices, laptops, desktops, IoT devices, IoE devices, web browsers, web cookies, or a combination thereof.

The connection information component 715 may receive connection information for the set of devices.

The machine-learning component 720 may perform a machine-learning process based on the set of device characteristics and the connection information. In some examples, performing the machine-learning process may involve the machine-learning component 720 generating an HL-MRF model, where a probability density function may be determined based on the HL-MRF model. In some examples, generating the HL-MRF model may involve the machine-learning component 720 using PSL to generate the HL-MRF model.

The function determination component 725 may determine a probability density function for device association based on an output of the machine-learning process. The device association component 730 may identify multiple sets of associated devices based on the probability density function for device association.

The transmission component 735 may transmit, to a device, information for display corresponding to at least one set of the multiple identified sets of associated devices.

The weight threshold component 740 may receive a weight threshold for association, where the multiple sets of associated devices is determined based on the probability density function for device association and the weight threshold.

The constraint optimization component 745 may receive a constraint for a constraint optimization process, where the multiple sets of associated devices is determined based on the probability density function for device association and the constraint for the constraint optimization process. In some cases, the constraint for the constraint optimization process includes a threshold number of total device associations, a threshold number of associations per device, a threshold number of devices per association, or a combination thereof.

The device graph generator 750 may generate, based on the probability density function for device association, a device graph including a set of nodes and a set of weighted edges, where each node of the set of nodes corresponds to a device of the set of devices and each weighted edge of the set of weighted edges connects two nodes of the set of nodes and corresponds to a probability that two devices corresponding to the connected two nodes are associated. In some examples, the device graph generator 750 may remove a set of weighted edges from the device graph based on one or more association constraints. In these examples, the device graph generator 750 may identify a set of device sub-graphs resulting from removing the set of weighted edges, where connected nodes of the set of device sub-graphs indicate the multiple sets of associated devices.

The update component 755 may iteratively update weighting values for the probability density function for device association based on updating the set of device characteristics, updating the set of devices, updating the connection information, or a combination thereof.

The association query handler 760 may receive, from the device, a query message indicating a first device of the set of devices and may determine the at least one set of the identified sets of associated devices based on the indicated first device, where the at least one set of the identified sets of associated devices includes the indicated first device and one or more additional devices. In some cases, transmitting the information for display may involve the transmission component 735 transmitting, to the device in response to the query message, an indication of the one or more additional devices.

In some cases, each set of associated devices is associated with a respective entity. In some examples, the association query handler 760 may receive, from the device, a query message indicating an entity and may determine the at least one set of the identified sets of associated devices based on the indicated entity, where the at least one set of the identified sets of associated devices is associated with the indicated entity. In some cases, transmitting the information for display may involve the transmission component 735 transmitting, to the device in response to the query message, an indication of each associated device in the at least one set of the identified sets of associated devices. In some cases, the entity is an example of a single user, a set of users, a household, an organization, or a combination thereof.

Figure 8:
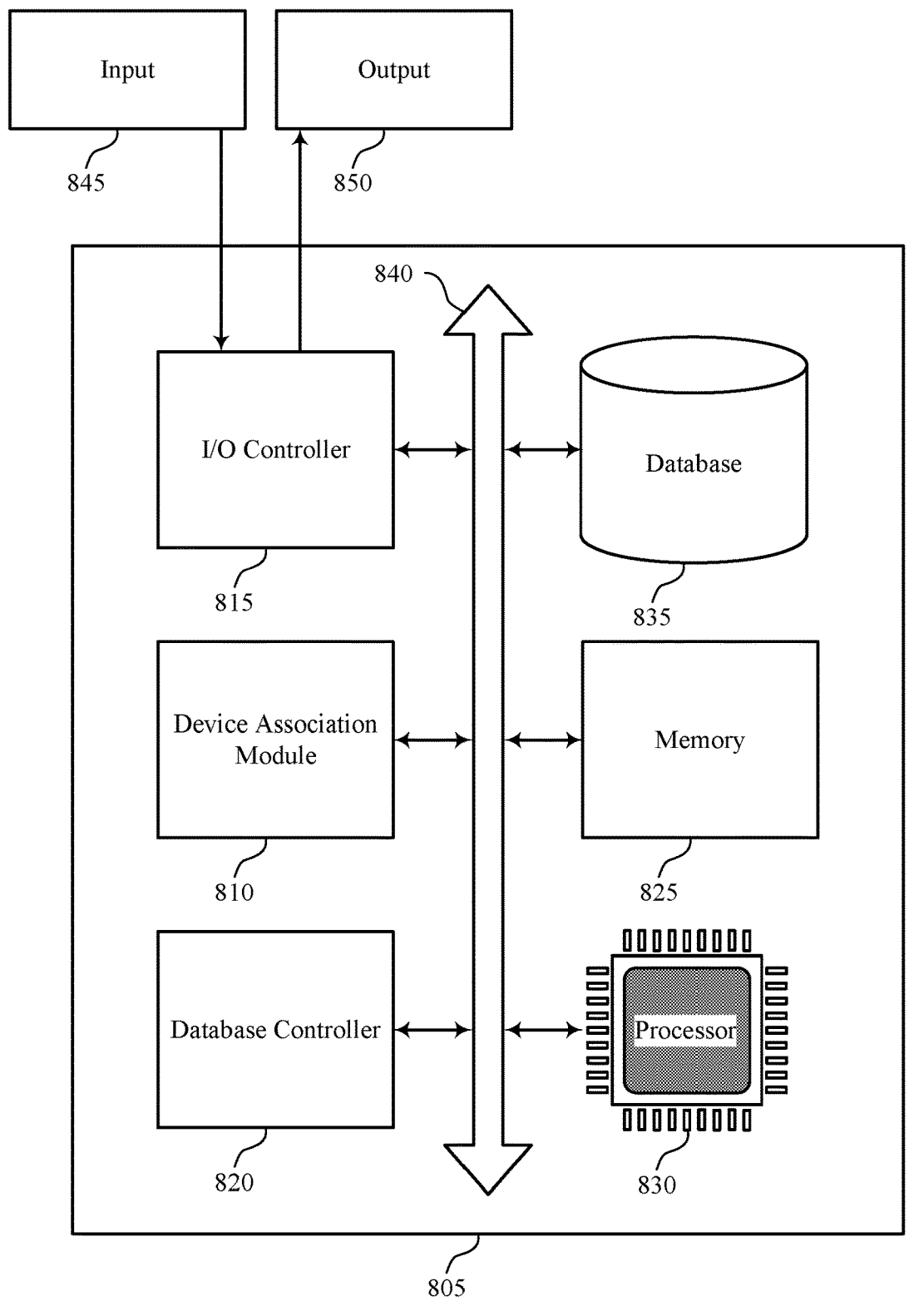
FIG. 8 shows a diagram of a system including a device that supports a probabilistic framework for determining device associations in accordance with aspects of the present disclosure.

FIG. 8 shows a diagram of a system 800 including a device 805 that supports a probabilistic framework for determining device associations in accordance with aspects of the present disclosure. The device 805 may be an example of or include the components of a database, a server (e.g., an application server, a database server, a server cluster, a virtual machine, etc.), a user device, or an apparatus 605 as described herein. The device 805 may include components for bi-directional data communications including components for transmitting and receiving communications, including a device association module 810, an I/O controller 815, a database controller 820, memory 825, a processor 830, and a database 835. These components may be in electronic communication via one or more buses (e.g., bus 840).

The device association module 810 may be an example of a device association module 615 or 705 as described herein. For example, the device association module 810 may perform any of the methods or processes described above with reference to FIGS. 6 and 7. In some cases, the device association module 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting a probabilistic framework for determining device associations).

Figure 9:
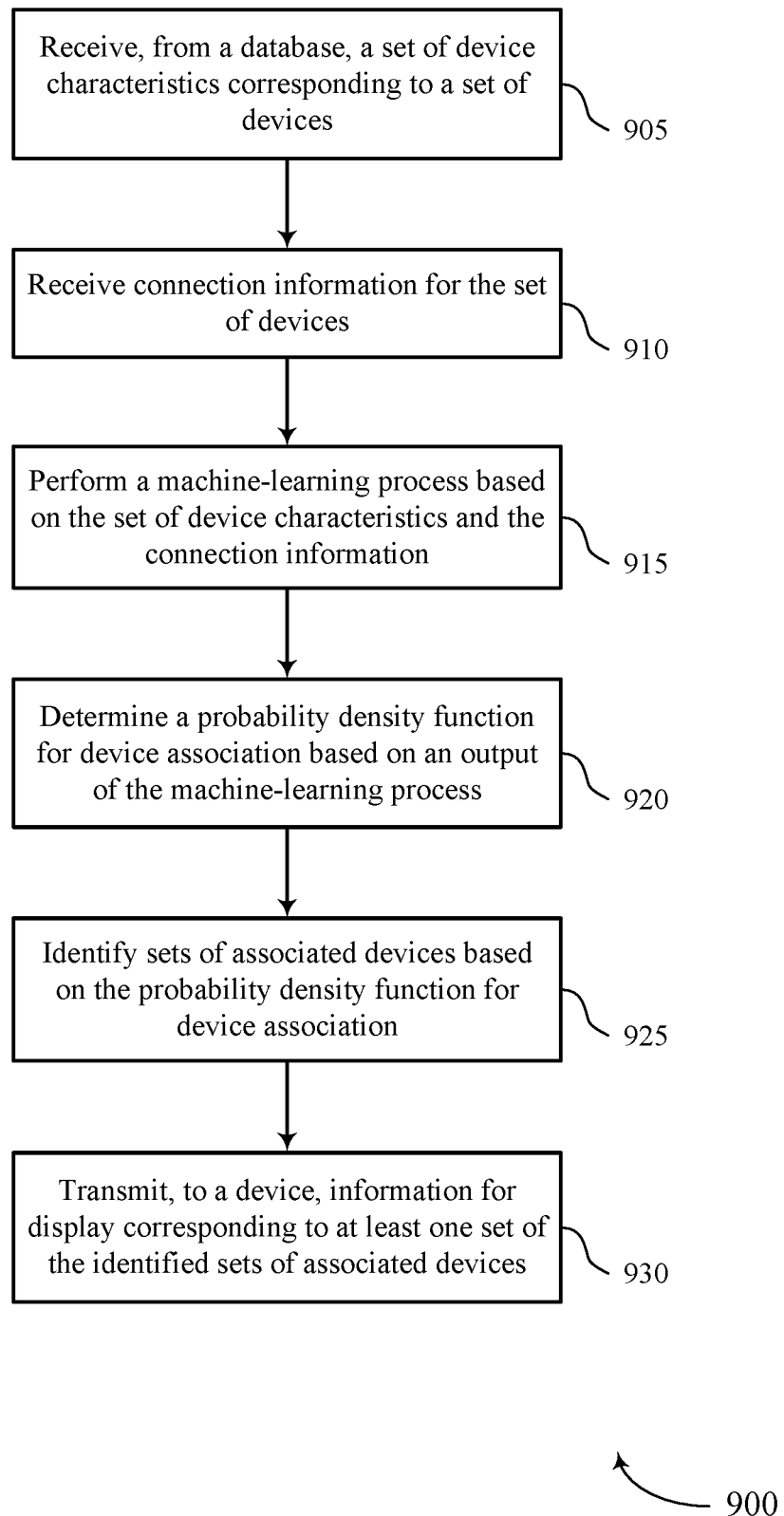
FIGS. 9 through 11 show flowcharts illustrating methods that support a probabilistic framework for determining device associations in accordance with aspects of the present disclosure.

FIG. 9 shows a flowchart illustrating a method 900 that supports a probabilistic framework for determining device associations in accordance with aspects of the present disclosure. The operations of method 900 may be implemented by a data processing device (e.g., a database, a server, a user device, etc.) or its components as described herein. For example, the operations of method 900 may be performed by a device association module as described with reference to FIGS. 6 through 8. In some examples, a device may execute a set of instructions to control the functional elements of the application server to perform the functions described below. Additionally or alternatively, the device may perform aspects of the functions described below using special-purpose hardware.

At 905, the data processing device may receive, from a database, a set of device characteristics corresponding to a set of devices, where each device of the set of devices is associated with a respective set of device characteristics of the set of device characteristics. The operations of 905 may be performed according to the methods described herein. In some examples, aspects of the operations of 905 may be performed by a device characteristics component as described with reference to FIGS. 6 through 8.

At 910, the data processing device may receive connection information for the set of devices. The operations of 910 may be performed according to the methods described herein. In some examples, aspects of the operations of 910 may be performed by a connection information component as described with reference to FIGS. 6 through 8.

At 915, the data processing device may perform a machine-learning process based on the set of device characteristics and the connection information. The operations of 915 may be performed according to the methods described herein. In some examples, aspects of the operations of 915 may be performed by a machine-learning component as described with reference to FIGS. 6 through 8.

At 920, the data processing device may determine a probability density function for device association based on an output of the machine-learning process. The operations of 920 may be performed according to the methods described herein. In some examples, aspects of the operations of 920 may be performed by a function determination component as described with reference to FIGS. 6 through 8.

At 925, the data processing device may identify multiple sets of associated devices based on the probability density function for device association. The operations of 925 may be performed according to the methods described herein. In some examples, aspects of the operations of 925 may be performed by a device association component as described with reference to FIGS. 6 through 8.

At 930, the data processing device may transmit, to a device, information for display corresponding to at least one set of the multiple identified sets of associated devices. The operations of 930 may be performed according to the methods described herein. In some examples, aspects of the operations of 930 may be performed by a transmission component as described with reference to FIGS. 6 through 8.

Figure 10:
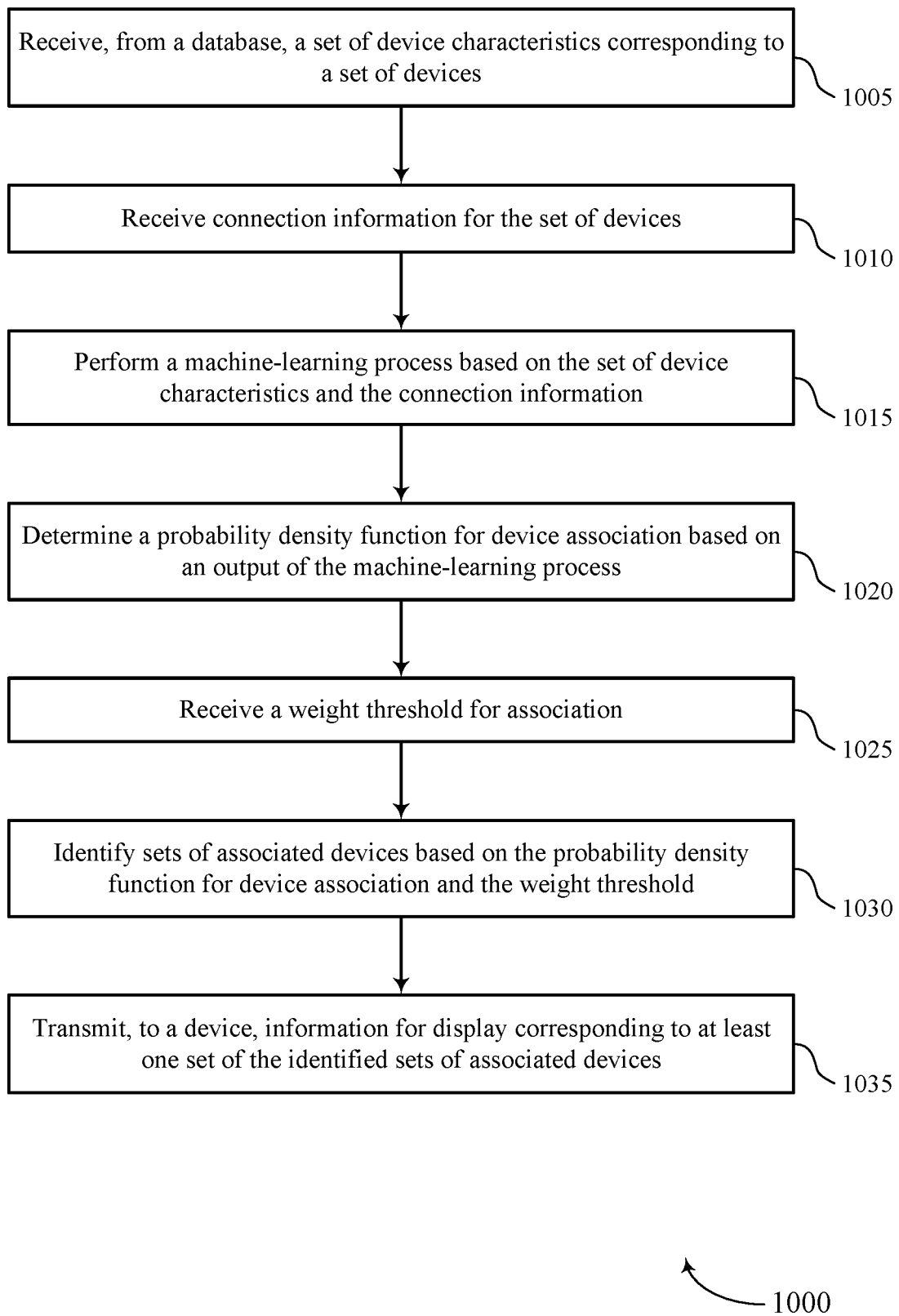

FIG. 10 shows a flowchart illustrating a method 1000 that supports a probabilistic framework for determining device associations in accordance with aspects of the present disclosure. The operations of method 1000 may be implemented by a data processing device (e.g., a database, a server, a user device, etc.) or its components as described herein. For example, the operations of method 1000 may be performed by a device association module as described with reference to FIGS. 6 through 8. In some examples, a data processing device may execute a set of instructions to control the functional elements of the application server to perform the functions described below. Additionally or alternatively, a data processing device may perform aspects of the functions described below using special-purpose hardware.

At 1005, the data processing device may receive, from a database, a set of device characteristics corresponding to a set of devices, where each device of the set of devices is associated with a respective set of device characteristics of the set of device characteristics. The operations of 1005 may be performed according to the methods described herein. In some examples, aspects of the operations of 1005 may be performed by a device characteristics component as described with reference to FIGS. 6 through 8.

At 1010, the data processing device may receive connection information for the set of devices. The operations of 1010 may be performed according to the methods described herein. In some examples, aspects of the operations of 1010 may be performed by a connection information component as described with reference to FIGS. 6 through 8.

At 1015, the data processing device may perform a machine-learning process based on the set of device characteristics and the connection information. The operations of 1015 may be performed according to the methods described herein. In some examples, aspects of the operations of 1015 may be performed by a machine-learning component as described with reference to FIGS. 6 through 8.

At 1020, the data processing device may determine a probability density function for device association based on an output of the machine-learning process. The operations of 1020 may be performed according to the methods described herein. In some examples, aspects of the operations of 1020 may be performed by a function determination component as described with reference to FIGS. 6 through 8.

At 1025, the data processing device may receive a weight threshold for association. The operations of 1025 may be performed according to the methods described herein. In some examples, aspects of the operations of 1025 may be performed by a weight threshold component as described with reference to FIGS. 6 through 8.

At 1030, the data processing device may identify multiple sets of associated devices based on the probability density function for device association and the weight threshold. The operations of 1030 may be performed according to the methods described herein. In some examples, aspects of the operations of 1030 may be performed by a device association component as described with reference to FIGS. 6 through 8.

At 1035, the data processing device may transmit, to a device, information for display corresponding to at least one set of the identified sets of associated devices. The operations of 1035 may be performed according to the methods described herein. In some examples, aspects of the operations of 1035 may be performed by a transmission component as described with reference to FIGS. 6 through 8.

Figure 11:
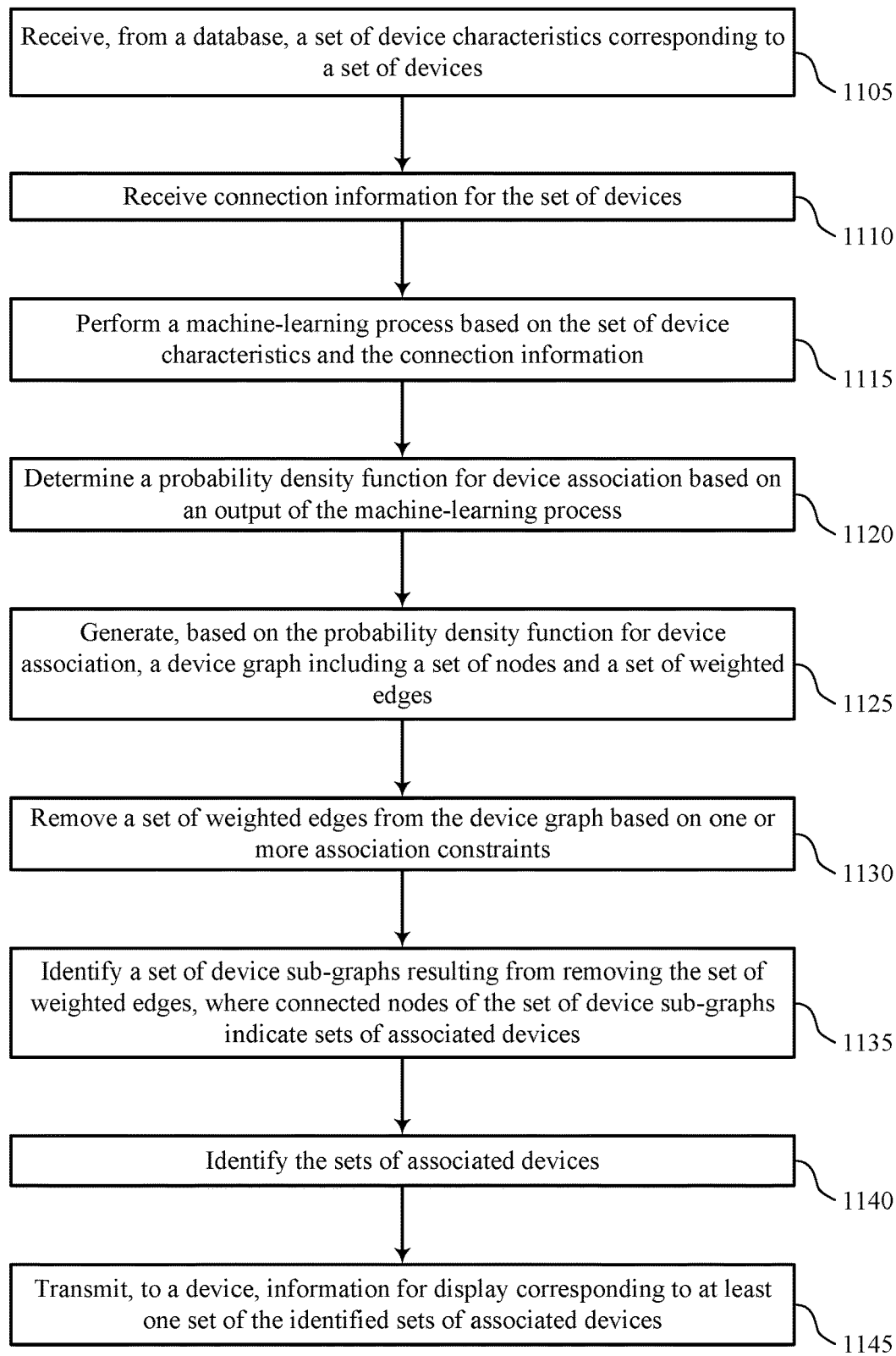

FIG. 11 shows a flowchart illustrating a method 1100 that supports a probabilistic framework for determining device associations in accordance with aspects of the present disclosure. The operations of method 1100 may be implemented by a data processing device (e.g., a database, a server, a user device, etc.) or its components as described herein. For example, the operations of method 1100 may be performed by a device association module as described with reference to FIGS. 6 through 8. In some examples, a data processing device may execute a set of instructions to control the functional elements of the application server to perform the functions described below. Additionally or alternatively, a data processing device may perform aspects of the functions described below using special-purpose hardware.

At 1105, the data processing device may receive, from a database, a set of device characteristics corresponding to a set of devices, where each device of the set of devices is associated with a respective set of device characteristics of the set of device characteristics. The operations of 1105 may be performed according to the methods described herein. In some examples, aspects of the operations of 1105 may be performed by a device characteristics component as described with reference to FIGS. 6 through 8.

At 1110, the data processing device may receive connection information for the set of devices. The operations of 1110 may be performed according to the methods described herein. In some examples, aspects of the operations of 1110 may be performed by a connection information component as described with reference to FIGS. 6 through 8.

At 1115, the data processing device may perform a machine-learning process based on the set of device characteristics and the connection information. The operations of 1115 may be performed according to the methods described herein. In some examples, aspects of the operations of 1115 may be performed by a machine-learning component as described with reference to FIGS. 6 through 8.

At 1120, the data processing device may determine a probability density function for device association based on an output of the machine-learning process. The operations of 1120 may be performed according to the methods described herein. In some examples, aspects of the operations of 1120 may be performed by a function determination component as described with reference to FIGS. 6 through 8.

At 1125, the data processing device may generate, based on the probability density function for device association, a device graph including a set of nodes and a set of weighted edges, where each node of the set of nodes corresponds to a device of the set of devices and each weighted edge of the set of weighted edges connects two nodes of the set of nodes and corresponds to a probability that two devices corresponding to the connected two nodes are associated. The operations of 1125 may be performed according to the methods described herein. In some examples, aspects of the operations of 1125 may be performed by a device graph generator as described with reference to FIGS. 6 through 8.

At 1130, the data processing device may remove a set of weighted edges from the device graph based on one or more association constraints. The operations of 1130 may be performed according to the methods described herein. In some examples, aspects of the operations of 1130 may be performed by a device graph generator as described with reference to FIGS. 6 through 8.

At 1135, the data processing device may identify a set of device sub-graphs resulting from removing the set of weighted edges, where connected nodes of the set of device sub-graphs indicate sets of associated devices. The operations of 1135 may be performed according to the methods described herein. In some examples, aspects of the operations of 1135 may be performed by a device graph generator as described with reference to FIGS. 6 through 8.

At 1140, the data processing device may identify the sets of associated devices based on the device sub-graphs, where the device sub-graphs are based on the probability density function for device association. The operations of 1140 may be performed according to the methods described herein. In some examples, aspects of the operations of 1140 may be performed by a device association component as described with reference to FIGS. 6 through 8.

At 1145, the data processing device may transmit, to a device, information for display corresponding to at least one set of the identified sets of associated devices. The operations of 1145 may be performed according to the methods described herein. In some examples, aspects of the operations of 1145 may be performed by a transmission component as described with reference to FIGS. 6 through 8.

A method for device association is described. The method may include receiving, from a database, a set of device characteristics corresponding to a set of devices, where each device of the set of devices is associated with a respective set of device characteristics of the set of device characteristics, and receiving connection information for the set of devices. The method may further include performing a machine-learning process based on the set of device characteristics and the connection information, determining a probability density function for device association based on an output of the machine-learning process, identifying multiple sets of associated devices based on the probability density function for device association, and transmitting, to a device, information for display corresponding to at least one set of the multiple identified sets of associated devices.

An apparatus for device association is described. The apparatus may include a processor, memory in electronic communication with the processor, and instructions stored in the memory. The instructions may be executable by the processor to cause the apparatus to receive, from a database, a set of device characteristics corresponding to a set of devices, where each device of the set of devices is associated with a respective set of device characteristics of the set of device characteristics, and receive connection information for the set of devices. The instructions may be further executable by the processor to cause the apparatus to perform a machine-learning process based on the set of device characteristics and the connection information, determine a probability density function for device association based on an output of the machine-learning process, identify sets of associated devices based on the probability density function for device association, and transmit, to a device, information for display corresponding to at least one set of the identified sets of associated devices.

Another apparatus for device association is described. The apparatus may include means for receiving, from a database, a set of device characteristics corresponding to a set of devices, where each device of the set of devices is associated with a respective set of device characteristics of the set of device characteristics, and means for receiving connection information for the set of devices. The apparatus may further include means for performing a machine-learning process based on the set of device characteristics and the connection information, means for determining a probability density function for device association based on an output of the machine-learning process, means for identifying sets of associated devices based on the probability density function for device association, and means for transmitting, to a device, information for display corresponding to at least one set of the identified sets of associated devices.

A non-transitory computer-readable medium storing code for device association is described. The code may include instructions executable by a processor to receive, from a database, a set of device characteristics corresponding to a set of devices, where each device of the set of devices is associated with a respective set of device characteristics of the set of device characteristics, and receive connection information for the set of devices. The code may further include instructions executable by the processor to perform a machine-learning process based on the set of device characteristics and the connection information, determine a probability density function for device association based on an output of the machine-learning process, identify sets of associated devices based on the probability density function for device association, and transmit, to a device, information for display corresponding to at least one set of the identified sets of associated devices.

In some examples of the method, apparatuses, and non-transitory computer-readable medium described herein, performing the machine-learning process may include operations, features, means, or instructions for generating an HL-MRF model, where the probability density function may be determined based on the HL-MRF model. In some examples of the method, apparatuses, and non-transitory computer-readable medium described herein, generating the HL-MRF model may include operations, features, means, or instructions for using PSL to generate the HL-MRF model.

Some examples of the method, apparatuses, and non-transitory computer-readable medium described herein may further include operations, features, means, or instructions for receiving a weight threshold for association, where the multiple sets of associated devices may be determined based on the probability density function for device association and the weight threshold.

Some examples of the method, apparatuses, and non-transitory computer-readable medium described herein may further include operations, features, means, or instructions for receiving a constraint for a constraint optimization process, where the multiple sets of associated devices may be determined based on the probability density function for device association and the constraint for the constraint optimization process. In some examples of the method, apparatuses, and non-transitory computer-readable medium described herein, the constraint for the constraint optimization process may be an example of a threshold number of total device associations, a threshold number of associations per device, a threshold number of devices per association, or a combination thereof.

Some examples of the method, apparatuses, and non-transitory computer-readable medium described herein may further include operations, features, means, or instructions for generating, based on the probability density function for device association, a device graph including a set of nodes and a set of weighted edges, where each node of the set of nodes corresponds to a device of the set of devices and each weighted edge of the set of weighted edges connects two nodes of the set of nodes and corresponds to a probability that two devices corresponding to the connected two nodes are associated. Some examples of the method, apparatuses, and non-transitory computer-readable medium described herein may further include operations, features, means, or instructions for removing a set of weighted edges from the device graph based on one or more association constraints and identifying a set of device sub-graphs resulting from removing the set of weighted edges, where connected nodes of the set of device sub-graphs indicate the multiple sets of associated devices.

Some examples of the method, apparatuses, and non-transitory computer-readable medium described herein may further include operations, features, means, or instructions for iteratively updating weighting values for the probability density function for device association based on updating the set of device characteristics, updating the set of devices, updating the connection information, or a combination thereof.

Some examples of the method, apparatuses, and non-transitory computer-readable medium described herein may further include operations, features, means, or instructions for receiving, from the device, a query message indicating a first device of the set of devices and determining the at least one set of the identified multiple sets of associated devices based on the indicated first device, where the at least one set of the identified multiple sets of associated devices includes the indicated first device and one or more additional devices. In some examples of the method, apparatuses, and non-transitory computer-readable medium described herein, transmitting the information for display may include operations, features, means, or instructions for transmitting, to the device in response to the query message, an indication of the one or more additional devices.

In some examples of the method, apparatuses, and non-transitory computer-readable medium described herein, each set of the multiple sets of associated devices may be associated with a respective entity. Some examples of the method, apparatuses, and non-transitory computer-readable medium described herein may further include operations, features, means, or instructions for receiving, from the device, a query message indicating an entity and determining the at least one set of the identified multiple sets of associated devices based on the indicated entity, where the at least one set of the identified multiple sets of associated devices may be associated with the indicated entity. In some examples of the method, apparatuses, and non-transitory computer-readable medium described herein, transmitting the information for display may include operations, features, means, or instructions for transmitting, to the device in response to the query message, an indication of each associated device in the at least one set of the identified multiple sets of associated devices. In some examples of the method, apparatuses, and non-transitory computer-readable medium described herein, the entity may be an example of a single user, a set of users, a household, an organization, or a combination thereof.

In some examples of the method, apparatuses, and non-transitory computer-readable medium described herein, the set of device characteristics includes authentication activity information, user agent information, device types, IP addresses, geographic location information, web activity information, activity timestamps, or a combination thereof. In some examples of the method, apparatuses, and non-transitory computer-readable medium described herein, the set of devices includes mobile devices, laptops, desktops, IoT devices, IoE devices, web browsers, web cookies, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for device association, comprising:
    receiving, from a database, a plurality of device characteristics corresponding to a plurality of devices, wherein each device of the plurality of devices is associated with a respective set of device characteristics of the plurality of device characteristics;
    receiving connection information for the plurality of devices;
    performing a machine-learning process based at least in part on the plurality of device characteristics and the connection information;
    determining a probability density function for device association based at least in part on an output of the machine-learning process;
    identifying a plurality of sets of associated devices based at least in part on the probability density function for device association; and
    transmitting, to a device, information for display corresponding to at least one set of the identified plurality of sets of associated devices.

2. The method of claim 1, wherein performing the machine-learning process comprises:
    generating a hinge-loss Markov Random Field (HL-MRF) model, wherein the probability density function is determined based at least in part on the HL-MRF model.

3. The method of claim 2, wherein generating the HL-MRF model comprises:
    using probabilistic soft logic (PSL) to generate the HL-MRF model.

4. The method of claim 1, further comprising:
    receiving a weight threshold for association, wherein the plurality of sets of associated devices is determined based at least in part on the probability density function for device association and the weight threshold.

5. The method of claim 1, further comprising:
    receiving a constraint for a constraint optimization process, wherein the plurality of sets of associated devices is determined based at least in part on the probability density function for device association and the constraint for the constraint optimization process.

6. The method of claim 5, wherein the constraint for the constraint optimization process comprises a threshold number of total device associations, a threshold number of associations per device, a threshold number of devices per association, or a combination thereof.

7. The method of claim 1, further comprising:
    generating, based at least in part on the probability density function for device association, a device graph comprising a plurality of nodes and a plurality of weighted edges, wherein each node of the plurality of nodes corresponds to a device of the plurality of devices and each weighted edge of the plurality of weighted edges connects two nodes of the plurality of nodes and corresponds to a probability that two devices corresponding to the connected two nodes are associated.

8. The method of claim 7, further comprising:
    removing a set of weighted edges from the device graph based at least in part on one or more association constraints; and
    identifying a plurality of device sub-graphs resulting from the removing the set of weighted edges, wherein connected nodes of the plurality of device sub-graphs indicate the identified plurality of sets of associated devices.

9. The method of claim 1, further comprising:
    iteratively updating weighting values for the probability density function for device association based at least in part on updating the plurality of device characteristics, updating the plurality of devices, updating the connection information, or a combination thereof.

10. The method of claim 1, further comprising:
    receiving, from the device, a query message indicating a first device of the plurality of devices; and
    determining the at least one set of the identified plurality of sets of associated devices based at least in part on the indicated first device, wherein the at least one set of the identified plurality of sets of associated devices comprises the indicated first device and one or more additional devices, and wherein transmitting the information for display comprises:
        transmitting, to the device in response to the query message, an indication of the one or more additional devices.

11. The method of claim 1, wherein each set of the plurality of sets of associated devices is associated with a respective entity.

12. The method of claim 11, further comprising:
    receiving, from the device, a query message indicating an entity; and
    determining the at least one set of the identified plurality of sets of associated devices based at least in part on the indicated entity, wherein the at least one set of the identified plurality of sets of associated devices is associated with the indicated entity, and wherein transmitting the information for display comprises:

transmitting, to the device in response to the query message, an indication of each associated device in the at least one set of the identified plurality of sets of associated devices.

13. The method of claim 11, wherein the entity comprises a single user, a set of users, a household, an organization, or a combination thereof.

14. The method of claim 1, wherein the plurality of device characteristics comprises authentication activity information, user agent information, device types, internet protocol (IP) addresses, geographic location information, web activity information, activity timestamps, or a combination thereof.

15. The method of claim 1, wherein the plurality of devices comprises mobile devices, laptops, desktops, internet of things (IoT) devices, internet of everything (IoE) devices, web browsers, web cookies, or a combination thereof.

16. An apparatus for device association, comprising:

a processor;

memory in electronic communication with the processor; and instructions stored in the memory and executable by the processor to cause the apparatus to:

receive, from a database, a plurality of device characteristics corresponding to a plurality of devices, wherein each device of the plurality of devices is associated with a respective set of device characteristics of the plurality of device characteristics;

receive connection information for the plurality of devices;

perform a machine-learning process based at least in part on the plurality of device characteristics and the connection information;

determine a probability density function for device association based at least in part on an output of the machine-learning process;

identify a plurality of sets of associated devices based at least in part on the probability density function for device association; and transmit, to a device, information for display corresponding to at least one set of the identified plurality of sets of associated devices.

17. The apparatus of claim 16, wherein the instructions to perform the machine-learning process are executable by the processor to cause the apparatus to:

generate a hinge-loss Markov Random Field (HL-MRF) model, wherein the probability density function is determined based at least in part on the HL-MRF model.

18. The apparatus of claim 16, wherein the instructions are further executable by the processor to cause the apparatus to:

receive a weight threshold for association, wherein the plurality of sets of associated devices is determined based at least in part on the probability density function for device association and the weight threshold.

19. The apparatus of claim 16, wherein the instructions are further executable by the processor to cause the apparatus to:

receive a constraint for a constraint optimization process, wherein the plurality of sets of associated devices is determined based at least in part on the probability density function for device association and the constraint for the constraint optimization process.

20. A non-transitory computer-readable medium storing code for device association, the code comprising instructions executable by a processor to:

receive, from a database, a plurality of device characteristics corresponding to a plurality of devices, wherein each device of the plurality of devices is associated with a respective set of device characteristics of the plurality of device characteristics;

receive connection information for the plurality of devices;

perform a machine-learning process based at least in part on the plurality of device characteristics and the connection information;

determine a probability density function for device association based at least in part on an output of the machine-learning process;

identify a plurality of sets of associated devices based at least in part on the probability density function for device association; and transmit, to a device, information for display corresponding to at least one set of the identified plurality of sets of associated devices.

* * * * *